(12) United States Patent
Pittman et al.

(10) Patent No.: US 8,851,111 B2
(45) Date of Patent: Oct. 7, 2014

(54) ELECTRONIC PROPORTIONER USING CONTINUOUS METERING AND CORRECTION

(75) Inventors: David M. Pittman, Brooklyn Park, MN (US); Vu K. Nguyen, Brooklyn Park, MN (US)

(73) Assignee: Graco Inc., Minneapolis, MN (US)

( * ) Notice: Subject to any disclaimer, the term of this patent is extended or adjusted under 35 U.S.C. 154(b) by 164 days.

(21) Appl. No.: 10/496,427

(22) PCT Filed: Nov. 27, 2002

(86) PCT No.: PCT/US02/38037
§ 371 (c)(1),
(2), (4) Date: May 23, 2005

(87) PCT Pub. No.: WO03/045130
PCT Pub. Date: Jun. 5, 2003

(65) Prior Publication Data
US 2006/0144447 A1   Jul. 6, 2006

Related U.S. Application Data

(60) Provisional application No. 60/333,697, filed on Nov. 27, 2001.

(51) Int. Cl.
*B01F 15/04* (2006.01)
*F04B 11/00* (2006.01)
*G05D 11/00* (2006.01)
*B44D 3/08* (2006.01)
*F04B 49/03* (2006.01)
*B01F 15/00* (2006.01)
*G05D 11/13* (2006.01)
*F04B 49/22* (2006.01)

(52) U.S. Cl.
CPC ............. *F04B 11/00* (2013.01); *B01F 15/0462* (2013.01); *G05D 11/005* (2013.01); *B01F 15/0458* (2013.01); *B44D 3/08* (2013.01); *F04B 49/03* (2013.01); *B01F 15/00155* (2013.01); *G05D 11/133* (2013.01); *F04B 49/22* (2013.01)
USPC ................... 137/565.33; 137/899.4; 417/403; 222/1; 222/63; 222/145.5

(58) Field of Classification Search
USPC ......... 137/565.29, 565.3, 565.33, 899, 899.4; 417/46, 403; 222/145.5–145.6, 63, 1
See application file for complete search history.

(56) References Cited

U.S. PATENT DOCUMENTS

| 4,026,439 A | 5/1977 | Cocks |
| 4,191,309 A | 3/1980 | Alley et al. |

(Continued)

FOREIGN PATENT DOCUMENTS

| EP | 0 045 536 A2 | 2/1982 |
| EP | 0 630 810 A1 | 12/1994 |

(Continued)

*Primary Examiner* — Craig Schneider
(74) *Attorney, Agent, or Firm* — Faegre Baker Daniels LLP

(57) ABSTRACT

The controller of the plural component proportioner (10) dispenses both components (or all three if a three component material) simultaneously (at least initially) and maintains ratio at the end of each predetermined volume of material by determining which component pump (12) has reached the desired amount of travel (given the resolution available) and using a valve (16) to shut off output of that pump until the other side has caught up. At pump changeover, the output valve for that pump (12) is shut off and the air motor (12a) allowed to run until travel stops to account for cavitation, air entrainment, compressibility, or poor inlet check performance.

17 Claims, 2 Drawing Sheets

(56) References Cited

U.S. PATENT DOCUMENTS

| | | | |
|---|---|---|---|
| 4,358,054 A | 11/1982 | Ehrat | |
| 4,359,312 A | 11/1982 | Funke et al. | |
| 4,494,676 A | 1/1985 | Berwegger et al. | |
| 4,545,396 A | 10/1985 | Miller et al. | |
| 4,734,711 A * | 3/1988 | Piatt et al. | 347/17 |
| 4,895,303 A | 1/1990 | Freyvogel | |
| 4,917,304 A | 4/1990 | Mazzei et al. | |
| 5,135,174 A | 8/1992 | Chaplinsky | |
| 5,443,180 A * | 8/1995 | Dussau | 222/1 |
| 5,507,412 A * | 4/1996 | Ebert et al. | 222/63 |
| 5,605,252 A | 2/1997 | Owen et al. | |
| 5,664,938 A * | 9/1997 | Yang | 417/313 |
| 6,896,152 B2 * | 5/2005 | Pittman et al. | 222/57 |
| 6,957,662 B2 * | 10/2005 | Lochtefeld et al. | 137/565.33 |
| 7,040,994 B2 * | 5/2006 | Lochtefeld et al. | 472/117 |

FOREIGN PATENT DOCUMENTS

| | | |
|---|---|---|
| GB | 1 245 097 | 9/1971 |
| WO | WO 85/01993 A | 5/1985 |
| WO | 01/64325 | 9/2001 |

\* cited by examiner

ELECTRONIC PROPORTIONER USING CONTINUOUS METERING AND CORRECTION

TECHNICAL FIELD

Related applications include U.S. Application Ser. No. 60/186405, filed Mar. 2, 2000, PCT application serial number PCT/US01/06904, filed Mar. 2, 2001 and U.S. Application Ser. No. 60/333,697, filed Nov. 27, 2001.

BACKGROUND ART

Proportioners such as those shown and described in the above applications, the contents of which are hereby incorporated by reference, are sold in the market by the assignee of the instant invention under the trademark VALUEMIX®.

DISCLOSURE OF THE INVENTION

In the instant invention, each of a pair (or more) of air-operated reciprocating piston pumps (such as those sold by the assignee of the instant invention under the trademark KING™ is provided with a linear displacement transducer (LDT) which is capable of communicating (as discussed in the aforementioned applications) a precise indication of the linear position of the air motor and pump rod. Also provided is a controllable valve connected to the output of each of the pumps.

Unlike the aforementioned VALUEMIX (which sequentially dispenses first one component and then the other of a plural component material), the controller of the instant invention dispenses both components (or all three if a three component material) simultaneously and maintains ratio at the end of each predetermined volume of material.

For example, if a material calls for a 2:1 (for components A and B) ratio, both valves will be open initially. The controller then looks at whichever side has hit its mark first (2 for the A side and one for the B side) and closes the valve on that side until the other side "catches up" and hits its mark.

Cavitation, air entrainment, compressibility, or poor inlet check performance all can result in a loss of correlation between pump travel and fluid dispensing. The following process is meant to correct for these issues. First, the controller determines when the pump has changed over. (This is predictable from previous cycles, or observable from the LDT reading) The controller will then close the fluid valve. This allows the pump to compress any gases and positively close the check valve. When the pump stalls, the fluid valve is reopened. The position of the pump at that point is starting value for fluid dispensed on that stroke.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
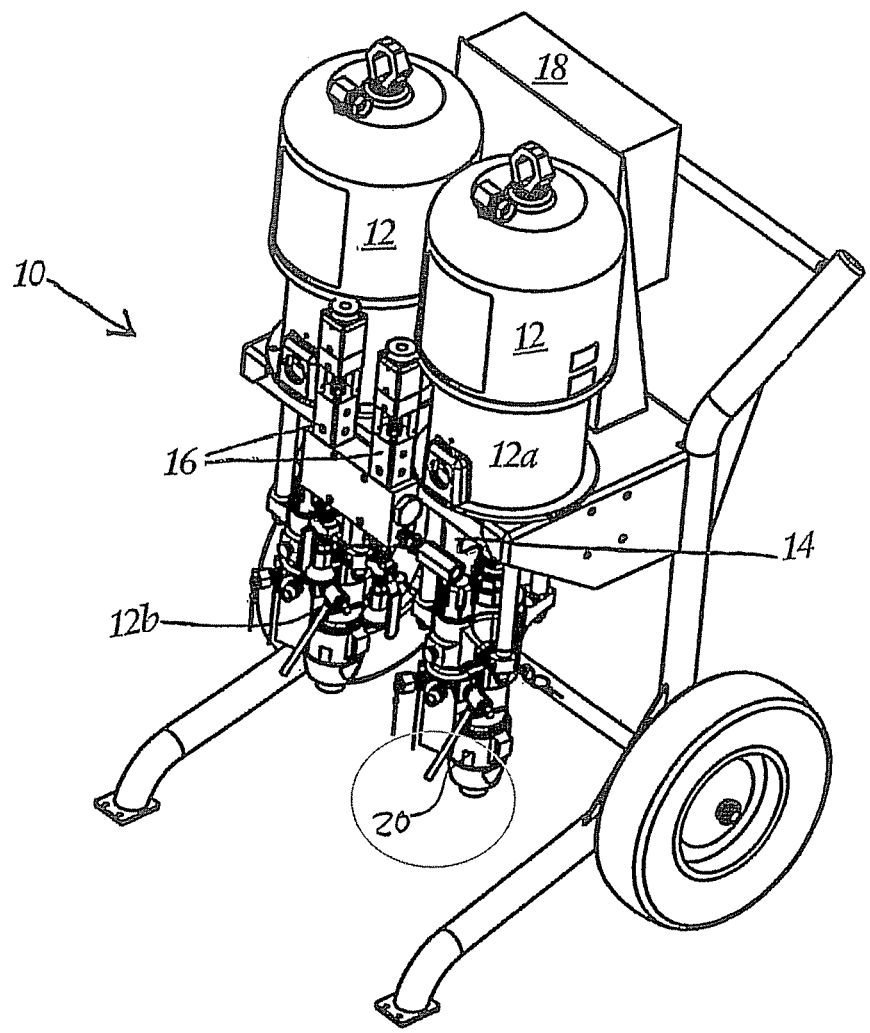
FIG. 1 is a front perspective view of the instant invention.
Figure 2:
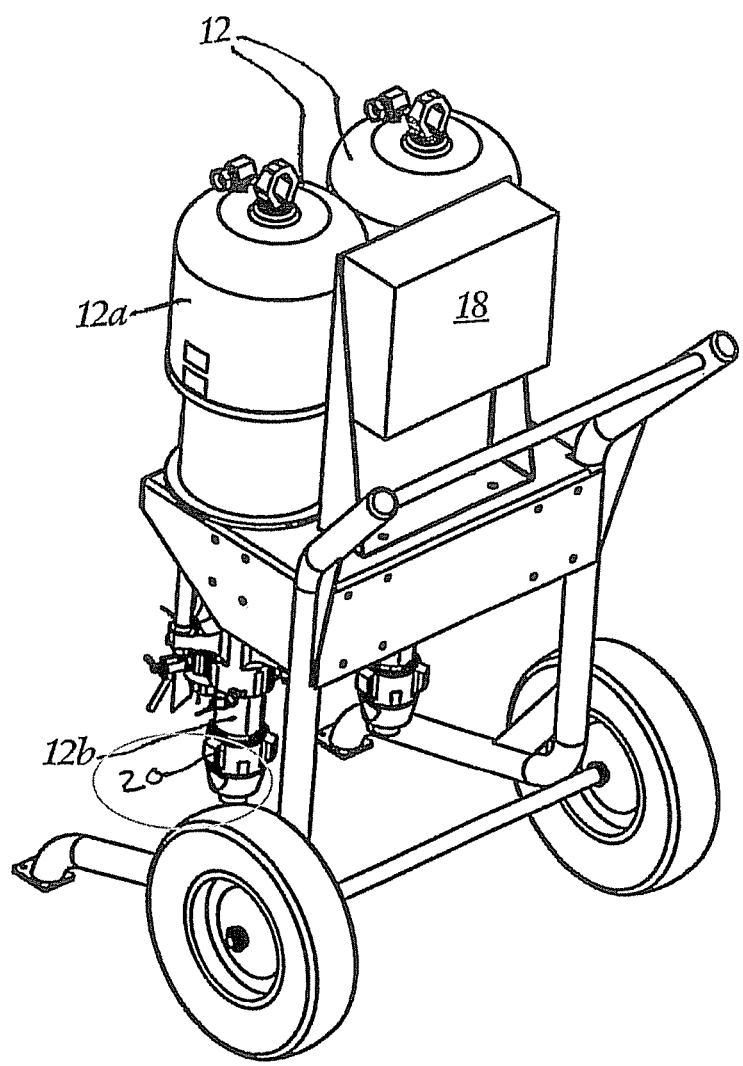
FIG. 2 is a rear perspective view of the instant invention.

In the instant invention 10, each of a pair (or more) of air-operated reciprocating piston pumps 12 (such as those sold by the assignee of the instant invention under the trademark KING™) is provided with a linear displacement transducer (LDT) 14 which is capable of communicating (as discussed in the aforementioned applications) a precise indication of the linear position of the air motor 12a and pump lower 12b. Of course any reciprocating power source may be used to power the pump lower 12b. The LDT 14 provides an output in units of travel or resolution which may vary with the model used. In the preferred embodiment, the resolution may be in the range of ¼ to ½ inch. Also provided is a controllable valve 16 connected to the output of each of the pumps 12.

Unlike the aforementioned prior art VALUEMIX (which sequentially dispenses first one component and then the other of a plural component material), the controller of the instant invention dispenses both components (or all three if a three component material) simultaneously (at least initially) and maintains ratio at the end of each predetermined volume of material.

For example, if a material calls for a 2:1 (for components A and B) ratio, both valves will be open initially. The controller 18 then looks at whichever side has hit its mark first (2 units of travel for the A side and one for the B side) and closes the valve on that side until the other side "catches up" and hits its mark. Thus, the system truly controls both sides rather than letting one run and trying to match the other as commonly occurs.

Cavitation, air entrainment, compressibility, or poor inlet check performance all can result in a loss of correlation between pump travel and fluid dispensing. The following process is meant to correct for these issues. First, the controller 18 determines when the pump 12 has changed over. (This is predictable from previous cycles, or observable from the LDT 14 reading) The controller 18 will then close the fluid valve 16. This allows the pump 12 to compress any gases and positively close the check valve 20. When the pump 12 stalls, the fluid valve 16 is reopened. The position of the pump 12 at that point is starting value for fluid dispensed on that stroke.

The air pressure can be varied so as to effectively run both pumps simultaneously and continuously. Also, the control may be set to control flow rather than pressure. If desired and sufficient length is available, the hose may be used as an integrator to aid in mixing. In another alternative embodiment, the lower volume side or material may be run at a higher pressure and with a single dosing valve.

The interface is divided into three sections. The basic section are a run and a stop button. Under a cover are a display that shows ratio, and a cycle counter and a 4-position rotary switch for
  Run
  Test
  Independent Run A Pump
  Independent Run B Pump
  5-digit 7-segment with decimal point to display ratio
  Lighted "Start" button (light while running)—momentary, non-latching
  Stop button—momentary, non-latching
  Ratio setting increments are 0.1, range is 0 to 10.
  Error code displayed in digital display (e.g. E:27).
  Following are operational modes:
  Run (proportion): Open both fluid valves. Monitor travel of each pump. If one pump has traveled disproportionately ahead of the other pump, close its fluid valve. Monitor travel of the remaining pump. Once the trailing pump has caught up, open the other fluid valve. Repeat.

Within the run mode, and pump test mode the controller will compensate for physical problems associated with top change-over. Cavitation, air entrainment, compressibility, or poor inlet check performance all result in a loss of correlation between pump travel and fluid dispensing. The following algorithm is meant to correct for these issues.

Determine when the pump has changed over. (This is predictable from previous cycles, or observable from the LDT reading) Close the fluid valve. This allows the pump to compress any gases and positively close the check valve. When the pump stalls reopen the fluid valve. The position of the pump at that point is starting value for fluid dispensed on that stroke.

Independent run: Run any one (and only one) pump just like a normal pump. Fluid valve is constantly open throughout cycle. Do not repeat change-over in less than 500 ms (Runaway control). Stop after 5 cycles.

Pump test: Run each pump through 3 full cycles plus extra distance necessary to compensate for top change-over error. (See Run Mode for description of change-over error compensation algorithm). Close the fluid valve once during the middle of each stroke and measure time delay until the pump stalls. This checks for a failed fluid valve, piston packings or check valve, or inlet valve failure.

Stop: Fluid valves and air valves closed.

Error: Special case of the stop mode. Fluid valves and recirculation valves closed. Error must be "acknowledged".

Calibration: Each LDT has a different offset and gain. The controller needs this data to work properly.

It is contemplated that various changes and modifications may be made to the proportioner without departing from the spirit and scope of the invention as defined by the following claims.

The invention claimed is:

1. A method for preparing to pump a first fluid that is originally compressible, comprising:
    providing a first positive displacement pump having:
        a first check valve;
        a first displacement transducer;
        a first outlet; and
        a first controllable valve at the first outlet that when closed stops the first fluid from flowing through the first outlet;
    closing said first controllable valve;
    intentionally engaging the first pump after the closing of the first controllable valve to compress the originally compressible first fluid and to build up pressure opposing the first pump;
    closing the first check valve after the first fluid is compressed;
    taking a first reading from the first displacement transducer when sufficient pressure has built up to cause the first pump to stall;
    keeping the first check valve closed; and using the first reading as a starting location for the first pump prior to opening the first controllable valve to permit the first fluid to flow from the first outlet.

2. The method of claim 1 for also preparing to pump a second fluid that is originally compressible, further comprising:
    providing a second positive displacement pump having:
        a second check valve;
        a second displacement transducer;
        a second outlet; and
        a second controllable valve at the second outlet that when closed stops the second fluid from flowing through the second outlet;
    closing said second controllable valve;
    intentionally engaging the second pump after the closing of the second controllable valve to compress the originally compressible second fluid and to build up pressure opposing the second pump;
    closing the second check valve after the second fluid is compressed;
    taking a second reading from the second displacement transducer when sufficient pressure has built up to cause the second pump to stall;
    keeping the second check valve closed; and using the second reading as a starting location for the second pump prior to opening the second controllable valve to permit the second fluid to flow from the second outlet.

3. The method of claim 2, wherein the first and second pumps are reciprocating pumps, and further comprising configuring the first and second outlets such that the first and second fluids will be mixed after flowing through the outlets.

4. The method of claim 2, wherein at least of the first pump and the second pump is a reciprocating pump.

5. The method of claim 2, wherein at least one of the first pump and the second pump is air-operated.

6. The method of claim 2, further comprising providing a controller that controls at least one of the first pump and the second pump.

7. The method of claim 6, further comprising providing a controller that controls at least one of the first pump and the second pump.

8. The method of claim 7, wherein the controller causes the first pump and the second pump to pump the first fluid and the second fluid simultaneously.

9. The method of claim 7, wherein the controller further controls at least one of the first controllable valve and the second controllable valve.

10. The method of claim 1, further comprising providing a controller that controls at least one of closing said first controllable valve, intentionally engaging the first pump, closing the first check valve, taking a first reading from the first displacement transducer, keeping the first check valve closed, and using the first reading as a starting location for the first pump prior to opening the first controllable valve.

11. The method of claim 10, wherein the controller controls at least one of closing said second controllable valve, intentionally engaging the second pump, closing the second check valve, taking a second reading from the second displacement transducer, keeping the second check valve closed, and using the second reading as a starting location for the second pump prior to opening the second controllable valve.

12. The method of claim 2, further comprising;
    providing a controller;
    having the controller cause the first fluid and the second fluid to flow from the first outlet and the second outlet respectively until the controller determines that a predetermined value corresponding to volume of one of the first fluid and the second fluid has flowed from one of the first outlet and the second outlet respectively; and
    having the controller stop flow of one of the first fluid and the second fluid depending which of the first fluid and the second fluid the controller has determined reached the predetermined value.

13. The method of claim 1, further comprising determining whether the first pump has changed over.

14. The method of claim 2, further comprising determining whether the second pump has changed over.

15. The method of claim 1, further comprising measuring the period of time for the first pump to stall after the first controllable valve is closed.

16. The method of claim 2, further comprising measuring the period of time for the second pump to stall after the second controllable valve is closed.

17. The method of claim 1, wherein in the first displacement transducer has a first offset and a first gain, and wherein the second displacement transduce has a second offset and a second gain that are different from the first offset and the first gain.

* * * * *